United States Patent
Terada et al.

(10) Patent No.: US 12,319,309 B2
(45) Date of Patent: Jun. 3, 2025

(54) CONTROL REQUIREMENT DETERMINER, ROUGH TERRAIN VEHICLE, AND CONTROL REQUIREMENT DETERMINING METHOD FOR CALCULATING SURFACE UNEVENNESS

(71) Applicant: KAWASAKI MOTORS, LTD., Akashi (JP)

(72) Inventors: Takenori Terada, Kobe (JP); Atsushi Sano, Kobe (JP); Kazuya Nagasaka, Kobe (JP); Taichi Inaba, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 229 days.

(21) Appl. No.: 17/451,306

(22) Filed: Oct. 18, 2021

(65) Prior Publication Data
US 2023/0117152 A1  Apr. 20, 2023

(51) Int. Cl.
*B60W 40/06* (2012.01)
*B60W 40/068* (2012.01)
(Continued)

(52) U.S. Cl.
CPC ....... *B60W 60/001* (2020.02); *B60W 2530/10* (2013.01); *B60W 2552/30* (2020.02);
(Continued)

(58) Field of Classification Search
CPC ........... B60W 60/001; B60W 2530/10; B60W 2552/30; B60W 2552/35; B60W 2556/10;
(Continued)

(56) References Cited

U.S. PATENT DOCUMENTS

2013/0274956 A1 * 10/2013 Pilutti .............. G08G 1/096716
 701/1
2015/0203116 A1 * 7/2015 Fairgrieve .............. B60T 8/175
 701/93

(Continued)

FOREIGN PATENT DOCUMENTS

| IN | 513MU2014 A | * | 2/2014 |
| JP | H06-286447 A | | 10/1994 |
| KR | 101418091 B1 | * | 7/2014 |

OTHER PUBLICATIONS

Yoo_KR_101418091_B1_translated_description (Year: 2014).*

*Primary Examiner* — Jelani A Smith
*Assistant Examiner* — George A Alcorn, III
(74) *Attorney, Agent, or Firm* — Alleman Hall & Tuttle LLP

(57) ABSTRACT

A control requirement determiner includes: a storage that stores at least one piece of location information and one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past; and processing circuitry that calculates, based on the vehicle speed information, the acceleration information, and the sprung weight information of the past data, a degree of unevenness of a road surface, and determines, based on the calculated degree of unevenness of the road surface, a control requirement to be imposed on a control target of a rough terrain vehicle at the location indicated by the location information of the past data during travel.

20 Claims, 6 Drawing Sheets

(51) Int. Cl.
*B60W 40/072* (2012.01)
*B60W 60/00* (2020.01)

(52) U.S. Cl.
CPC ..... *B60W 2552/35* (2020.02); *B60W 2556/10* (2020.02); *B60W 2556/50* (2020.02); *B60W 2720/10* (2013.01); *B60W 2720/12* (2013.01)

(58) Field of Classification Search
CPC ......... B60W 2556/60; B60W 2720/10; B60W 2720/12; B60W 50/0097
USPC .......................................................... 701/25
See application file for complete search history.

(56) References Cited

U.S. PATENT DOCUMENTS

| | | | |
|---|---|---|---|
| 2016/0245648 A1* | 8/2016 | Tani ........................ | G01C 7/04 |
| 2017/0241778 A1* | 8/2017 | Hanatsuka ............... | G08G 1/01 |
| 2018/0068495 A1* | 3/2018 | Chainer ................ | G07C 5/008 |
| 2020/0105072 A1* | 4/2020 | Wisley .................. | G05D 1/021 |
| 2020/0361475 A1* | 11/2020 | Moerbe .............. | B60W 40/068 |
| 2020/0385007 A1* | 12/2020 | Bucht ................. | B60W 30/143 |
| 2021/0276550 A1* | 9/2021 | Gotou ...................... | G08G 1/16 |
| 2022/0281456 A1* | 9/2022 | Giovanardi ......... | G08G 1/09675 |

* cited by examiner

CONTROL REQUIREMENT DETERMINER, ROUGH TERRAIN VEHICLE, AND CONTROL REQUIREMENT DETERMINING METHOD FOR CALCULATING SURFACE UNEVENNESS

BACKGROUND

Technical Field

Aspects of the present disclosure relate to a control requirement determiner, a rough terrain vehicle, and a control requirement determining method.

Description of the Related Art

Rough terrain vehicles often travel on bad roads with uneven surfaces. Japanese Laid-Open Patent Application Publication No. H6-286447 discloses an automobile suspension device operable to reduce the caster angle during travel on a bad road whose surface unevenness is at or above a reference level.

SUMMARY

A control requirement determiner according to one aspect of the present disclosure is a control requirement determiner that determines a control requirement to be imposed on a control target that influences a behavior of a vehicle body of a rough terrain vehicle during travel of the rough terrain vehicle, the control requirement determiner including: a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past; and processing circuitry that determines, based on the behavior information associated with the location information of the past data, the control requirement to be imposed on the control target at the location indicated by the location information of the past data during travel of the rough terrain vehicle.

A rough terrain vehicle according to one aspect of the present disclosure includes: a vehicle body; a control target that influences a behavior of the vehicle body during travel of the rough terrain vehicle; a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information during travel of the vehicle, the vehicle being the rough terrain vehicle or another vehicle; processing circuitry that determines, based on the behavior information associated with the location information of the past data, a control requirement to be imposed on the control target at the location indicated by the location information of the past data during travel of the rough terrain vehicle; a location detector that detects a geographic location of the vehicle body; and a controller that controls the control target based on the location detected by the location detector and the control requirement.

A control requirement determining method according to one aspect of the present disclosure is a control requirement determining method for determining a control requirement to be imposed on a control target that influences a behavior of a vehicle body of a rough terrain vehicle during travel of the rough terrain vehicle, the method including: causing a storage to store at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past; and causing processing circuitry to, based on the behavior information associated with the location information of the past data, determine the control requirement to be imposed on the control target at the location indicated by the location information of the past data during travel of the rough terrain vehicle.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, exemplary embodiments will be described with reference to the drawings.

Figure 1:
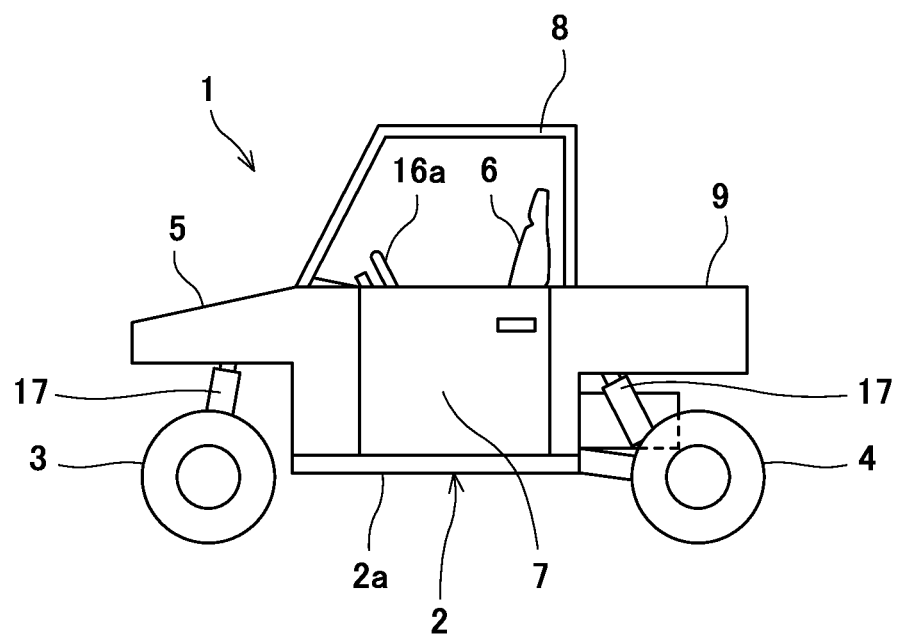
FIG. 1 is a schematic left side view of a rough terrain vehicle including a control requirement determiner according to an exemplary embodiment.

FIG. 1 is a schematic left side view of a rough terrain vehicle 1 including a control requirement determiner 30 according to an exemplary embodiment. The rough terrain vehicle 1 is used for travel on unpaved road surfaces, in particular so-called rough terrains. In the present embodiment, a utility vehicle is illustrated as an example of such a rough terrain vehicle 1. In the following description, the rough terrain vehicle 1 may be simply referred to as "vehicle 1".

As shown in FIG. 1, the vehicle 1 includes a vehicle body 2, a pair of left and right front wheels 3 supporting a front portion of the vehicle body 2, and a pair of left and right rear wheels 4 supporting a rear portion of the vehicle body 2. The tires of the front and rear wheels 3 and 4 are balloon tires for travel on rough terrains. In the present embodiment, the vehicle 1 is switchable between a two-wheel-drive mode and a four-wheel-drive mode. To this end, a pair of front drive shafts extending in the left-right direction are coupled respectively to the pair of front wheels 3. Additionally, a pair of rear drive shafts extending the left-right direction are coupled respectively to the pair of rear wheels 4.

The vehicle body 2 includes a base frame 2a. The base frame 2a includes a pipe frame made up of pipes connected together. The base frame 2a is supported by the front and rear wheels 3 and 4 via suspensions 17. The base frame 2a supports a hood 5, a pair of occupant seats 6, a pair of doors 7, a cabin frame 8, and a cargo carrier 9. The hood 5 is made of resin and covers the space between the left and right front wheels 3 from above. The pair of occupant seats 6 are located behind the hood 5 and arranged side by side. The pair of doors 7 are located outside the pair of occupant seats 6, respectively, in the left-right direction. The cabin frame 8 is shaped to surround the cabin, namely the occupant space, in which the occupant seats 6 are located. A steering handle 16a is located in the occupant space. The cargo carrier 9 is located behind the occupant seats 6. The cargo carrier 9 defines a hollow loading space such that loads can be carried.

The vehicle body 2 is supported by the four wheels 3 and 4 via the four suspensions 17. The four suspensions 17 connect the four wheels 3 and 4, respectively, to the vehicle body 2.

Figure 2:
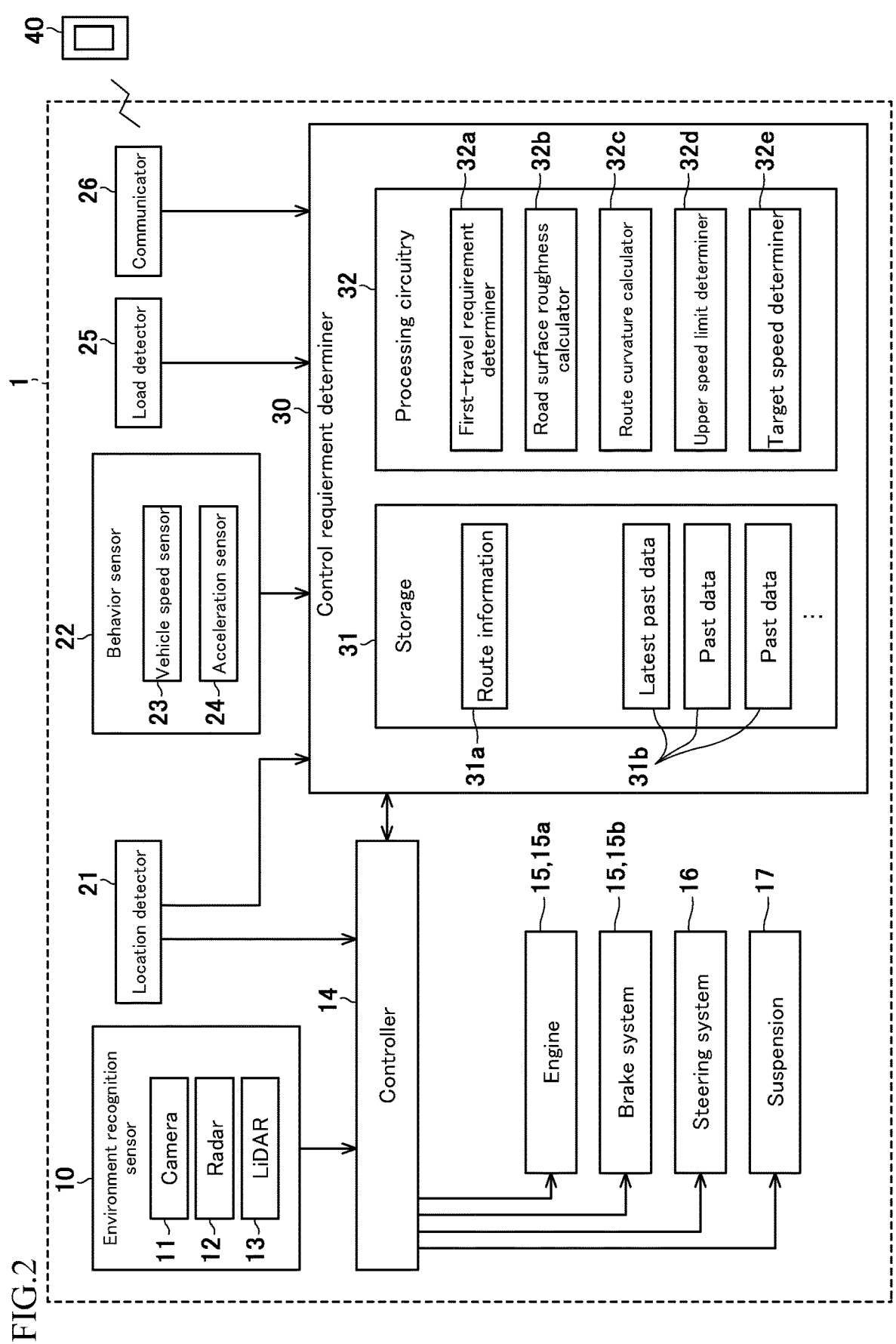
FIG. 2 is a block diagram showing a schematic configuration of a control system of the rough terrain vehicle of FIG. 1.

FIG. 2 is a block diagram showing a schematic configuration of a control system of the rough terrain vehicle 1 of FIG. 1. The vehicle 1 includes a controller 14 that controls at least one control target. The at least one control target influences a behavior of the vehicle body 2 of the vehicle 1 during travel of the vehicle 1. The behavior of the vehicle body 2 is correlated with a change in motion of the vehicle body 2. For example, the behavior of the vehicle body 2 may be motion information representing a change in location of the vehicle body 2 in the direction of at least one of three orthogonal axes defined for the vehicle body 2, i.e., yaw, pitch, and roll axes. For example, the behavior of the vehicle body 2 may be a change in location of the vehicle body 2 in the travel direction, i.e., speed, acceleration, or deceleration of the vehicle body 2 in the travel direction. The behavior of the vehicle body 2 may be motion information representing a change in angular position of the vehicle body 2 about at least one of three orthogonal axes defined for the vehicle body 2. For example, the behavior of the vehicle body 2 may be motion information representing changes in angular position of the vehicle body 2 about the yaw, pitch, and roll axes. The behavior of the vehicle body 2 may be any information representing the motion as mentioned above, and may be the amplitude or frequency of the vibration of the vehicle body 2. In the present embodiment, the at least one control target that influences the behavior of the vehicle body 2 includes a torque generator 15, a steering system 16, and the suspensions 17. The control target may be, for example, an actuator. In the present embodiment, the control target is controllable by the controller 14 described later.

The torque generator 15 generates torques to be transmitted to the wheels 3 and 4 of the rough terrain vehicle 1. The torque generator 15 includes an engine 15a that generates a positive torque acting in the travel direction and a brake system 15b that generates a negative torque acting in a direction opposite the travel direction. The engine 15a is a drive power source and generates drive power to be transmitted to the drive wheels. For example, the rotational power from the engine 15a is transmitted to each of the pair of rear drive shafts through a rear wheel differential that permits the pair of rear wheels 4 to rotate at different speeds. The drive power source may be other than the engine and may include, for example, a battery and an electric motor rotationally driven by the battery. The engine 15a in this example is arranged such that the positive torque, namely the engine output torque, is controllable by the controller. For example, the amount of air taken into the engine can be regulated by electronically controlling an electric throttle valve. This allows the engine to output a controlled positive torque as a function of the amount of air taken into the engine. The negative torque may be generated by engine braking or regeneration of the electric motor.

The brake system 15b includes a front wheel brake system that applies braking forces to the front wheels 3 and a rear wheel brake system that applies braking forces to the rear wheels 4. Both the front and rear wheel brake systems are hydraulically actuated, and the braking forces applied by the brake systems to the wheels 3 and 4 are generally proportional to brake pressures.

Each suspension 17 is an electronically controlled suspension. For example, the suspension 17 includes: an arm structure that connects the front wheels 3 to the vehicle body 2 in a manner permitting vertical movement of the front wheels 3 relative to the vehicle body 2; and an absorber that connects the arm structure to the vehicle body 2 and whose damping coefficient is variable by electronic control. For the absorber, not only the damping coefficient but also the spring constant and the amount of extension/contraction in the initial state may be variable by electronic control.

In the present embodiment, the vehicle 1 is an autonomous vehicle configured to autonomously travel under control of the controller 14 for controlling the torque generator 15 and steering system 16. The vehicle 1 can function as a full self-driving vehicle that autonomously travels along a travel route designated by the user without the need for any driving operation of the user. For example, the vehicle 1 includes at least one environment recognition sensor 10 and a location detector 21 as devices that detect information for autonomous travel.

The at least one environment recognition sensor 10 is used for recognition of the surroundings of the vehicle 1. For example, the at least one environment recognition sensor 10 detects the travel road environment or the presence or absence of any pedestrian around the traveling vehicle 1. For example, the at least one environment recognition sensor 10 includes a camera 11, a radar 12 such as a millimeter-wave radar, or a LiDAR (Light Detection and Ranging) 13.

The location detector 21 detects the geographic location of the vehicle body 2. In the present embodiment, the location detector 21 detects the current location of the vehicle body 2 on the earth based on a signal received from a satellite. That is, the location detector 21 is a receiver for GNSS (Global Navigation Satellite System) such as GPS (Global Positioning System). The location detector may detect the current location by acquiring information other than that received from a satellite. For example, the location detector may detect the current location based on the distance that the vehicle 1 has traveled from a given known location and the direction in which the vehicle 1 has traveled. The location detector may detect the current location using information received from a device such as a base station or mobile terminal that wirelessly transmits and receives electric waves.

The vehicle 1 further includes a behavior sensor 22, a load detector 25, and a communicator 26.

The behavior sensor 22 detects information related to the behavior of the vehicle body 2. The behavior sensor 22 includes a vehicle speed sensor 23 and an acceleration sensor 24. The vehicle speed sensor 23 detects the travel speed of the vehicle 1. The vehicle speed sensor may be mounted on a rotating part that rotates together with the wheels. The acceleration sensor 24 detects the vertical acceleration of the vehicle body 2. The acceleration sensor 24 detects the vertical acceleration of the so-called "sprung" portion of the vehicle 1. The acceleration sensor 24 is secured to the vehicle body 2. A so-called gyro sensor may be used as the acceleration sensor. The behavior information detected by the behavior sensor 22 is used by the control requirement determiner 30 described later. A stroke sensor that detects the amount of extension/contraction of the absorber supporting the arm structure and the vehicle body may be used as another behavior sensor. The behavior of the so-called "unsprung" portion of the vehicle is also involved in the behavior of the vehicle body. Thus, the behavior sensor may detect the vertical acceleration of the so-called "unsprung" portion of the vehicle. For example, the behavior sensor may output the vertical acceleration of at least one of the wheels as information related to the behavior of the vehicle body.

The load detector 25 detects the weight of the vehicle body 2. Information detected by the load detector 25 as to the weight of carried loads is stored as carried load information in a storage 31. The "carried loads" described herein include not only loads carried on the cargo carrier 9 but also loads located in the occupant space. The loads located in the occupant space include the occupants. The carried load information can be included in past data 31b described later. The load detector 25 may be embodied as a load sensor mounted below the seats or on the cargo carrier. The load detector 25 may be, for example, a strain gauge. The load detector 25 may be a calculator that estimates the weight of the carried loads or the weight distribution of the carried loads in the vehicle body based on various pieces of information. For example, the load detector 25 may estimate the weight of the carried loads based on an actually measured value of the acceleration that the vehicle 1 exhibits in response to a positive torque output of the engine 15a. The load detector 25 may estimate the weight of the carried loads based on the amount of extension/contraction of the absorber in the vehicle 1 at rest. The load detector 25 may determine the number or arrangement of the occupants based on detection values of seat belt sensors.

The communicator 26 communicates with an instructor 40 that receives instructions from the user. The instructor 40 is, for example, an information terminal owned by the user of the vehicle 1. The instructor 40 is, for example, a mobile information terminal such as a smartphone or tablet terminal. Instructions from the user are sent to the vehicle 1 through the instructor 40.

In the present embodiment, the vehicle 1 includes a control requirement determiner 30. The control requirement determiner 30 determines a control requirement to be imposed on a control target that influences the behavior of the vehicle body 2 of the rough terrain vehicle 1 during travel of the rough terrain vehicle 1. In this example, the control requirement determiner 30 determines the control requirement to be imposed on the control target such that the travel of the rough terrain vehicle 1 is adapted to the badness of the road surface as evaluated based on the behavior of the vehicle body. The controller 14 controls the control target based on the control requirement determined by the control requirement determiner 30.

The details will now be described. The rough terrain vehicle 1 more often travels on bad roads such as bumpy or muddy roads than vehicles for travel on paved roads. In the case of travel on such a bad road, it is preferable for the rough terrain vehicle 1 to travel at a relatively low speed. Lowering the speed of the vehicle makes it easier, for example, to suppress the vibration of the vehicle body and prevent wheel slip or wheel spin on the road surface. However, if the rough terrain vehicle 1 is controlled to travel at a fixed slow speed regardless of the evaluation of the badness of the road surface, the time efficiency of movement is reduced. In the present embodiment, the control requirement determined by the control requirement determiner 30 is imposed on the torque generator 15. Thus, it is possible to accomplish autonomous travel with a high time efficiency of movement while reducing the change in behavior of the vehicle body.

The control requirement determiner 30 includes a storage 31 and processing circuitry 32.

The storage 31 includes, for example, a non-volatile memory such as a ROM or flash memory and a volatile memory such as a RAM. The storage 31 stores at least one piece of location information and at least one piece of behavior information as past data 31b in which the location information and the behavior information are associated with each other. The location information indicates a geographical location as detected by the location detector 21 during travel of the vehicle 1 along a travel route, and the behavior information is related to the behavior of the vehicle body 2 as detected by the behavior sensor 22 during travel of the vehicle 1 along the travel route. In the present embodiment, the location information indicates a location on a predetermined travel route. In the present embodiment, the behavior information includes information related to the travel speed of the vehicle 1 and information related to the vertical acceleration of the vehicle body 2.

The processing circuitry 32 includes, for example, a processor. The processing circuitry 32 determines, based on the behavior information associated with the location information of the past data 31b, the control requirement to be imposed on the control target at the location indicated by the location information of the past data 31b during travel of the rough terrain vehicle 1. The processing circuitry 32 includes a first-travel requirement determiner 32a, a road surface roughness calculator 32b, a route curvature calculator 32c, an upper speed limit determiner 32d, and a target speed determiner 32e as functional units. These functional units 32a to 32e are implemented by the processing circuitry 32 retrieving and executing various programs stored in the storage 31. The details of the functional units 32a to 32e will be described with reference to FIG. 3.

Figure 3:
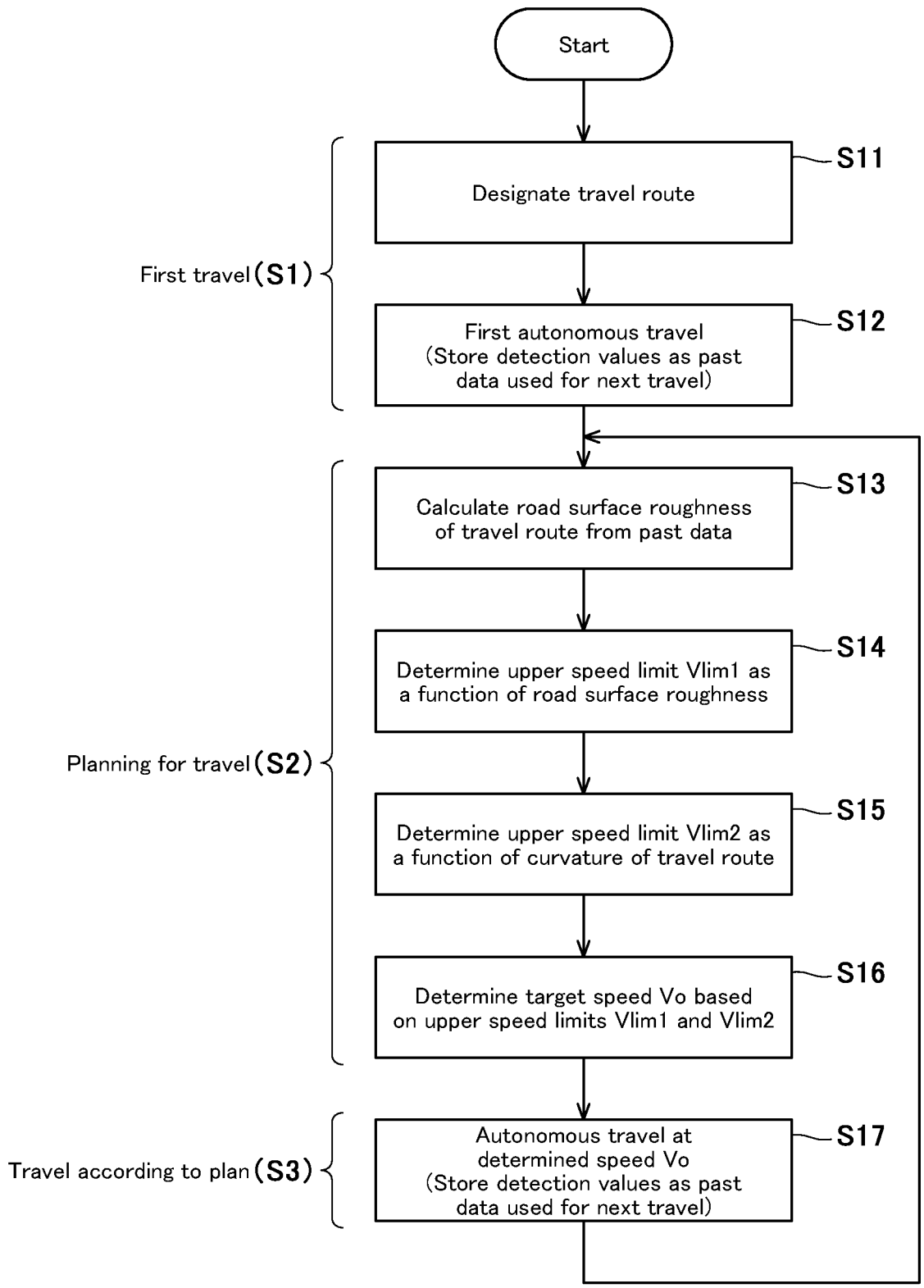
FIG. 3 is a flowchart showing the course of process that starts by designating a travel route and ends by causing the vehicle to autonomously travel based on a control requirement.

FIG. 3 is a flowchart showing the course of process that starts by designating a travel route and ends by causing the vehicle 1 to autonomously travel based on the control requirement determined by the control requirement determiner 30. The course of process that starts by designating a travel route and ends by causing the vehicle 1 to autonomously travel based on the control requirement determined by the control requirement determiner 30 is broadly divided into the following three steps: first travel S1, planning for travel S2, and travel according to plan S3.

First travel S1 is the step of causing the vehicle 1 to travel along a travel route to obtain the past data 31b used to determine the control requirement. Planning for travel S2 is the step of determining the control requirement to be imposed on the control target during next travel of the vehicle 1 along the travel route by using the past data 31b obtained in first travel S1. Travel according to plan S3 is the step of causing the vehicle 1 to travel along the travel route based on the control requirement determined in planning for travel S2.

First Travel S1
Travel Route Designation S11

Figure 4:
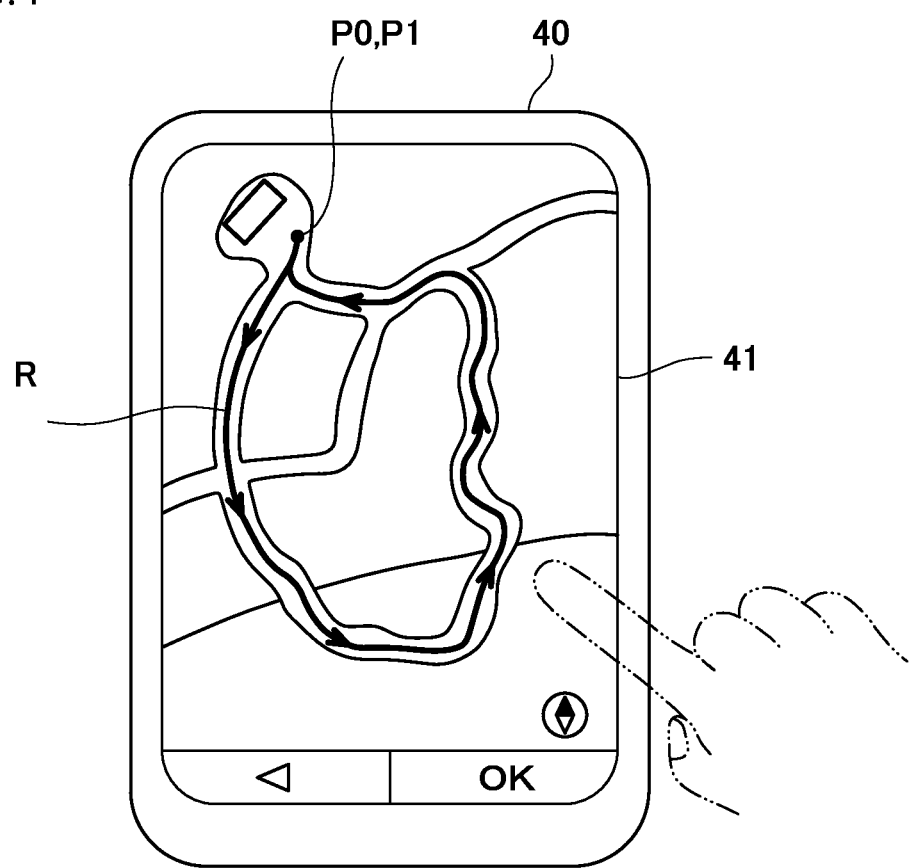
FIG. 4 shows a route designation screen for designation of a travel route.

In first travel S1, as shown in FIG. 3, the user designates a travel route (step S11). An example of how to designate the travel route will be described with reference to FIG. 4. FIG. 4 shows the instructor 40 displaying a route designation screen 41 for designation of a travel route R. The route designation screen 41 includes a map image. The user designates a desired travel route on the map. The route designation through the route designation screen 41 is not limited to being performed in a particular manner. For example, the user may designate a travel route by tracing a road on the map displayed on the route designation screen 41. Alternatively, the user may designate some points on the map, and a travel route may be automatically created by connecting the designated points to one another. Although in the travel route R of FIG. 4 the start and goal locations P0 and P1 coincide with each other, the start and goal locations on the travel route R need not coincide with each other.

Information indicating the travel route designated through the route designation screen 41 is sent as route information from the instructor 40 to the communicator 26 wirelessly or by wire. The route information may include information related to the direction in which the vehicle moves along the travel route. In the control requirement determiner 30, the first-travel requirement determiner 32a receives the route information 31a through the communicator 26 and stores the route information 31a into the storage 31.

First Autonomous Travel S12

Next, the first-travel requirement determiner 32a sends to the controller 14 a control requirement used for the first travel of the vehicle 1, and the controller 14 controls the torque generator 15 and steering system 16 based on the control requirement received from the first-travel requirement determiner 32a to cause the vehicle 1 to travel along the designated travel route.

For example, the first-travel requirement determiner 32a determines whether the past data 31b acquired through travel along the travel route indicated by the route information is already stored in the storage 31. That is, the first-travel requirement determiner 32a confirms whether the vehicle 1 travels on the travel route indicated by the route information for the first time. Further, the first-travel requirement determiner 32a determines whether the vehicle 1 is located on the travel route indicated by the route information 31a based on location information received from the location detector 21.

Upon determining that the storage 31 possesses no past data associated with the designated travel route and that the vehicle 1 is located on the travel route, the first-travel requirement determiner 32a sends to the controller 14 the control requirement to be imposed on the control target during the first travel of the vehicle 1. The first travel of step S12 can be carried out even in case that the storage 31 possesses past data associated with the designated travel route.

In the present embodiment, the control requirement sent to the controller 14 by the first-travel requirement determiner 32a is a target value related to the longitudinal motion of the vehicle 1. The target value related to the longitudinal motion of the vehicle 1 is a target value representing a slow speed which is equal to or lower than a given speed limit and at which the vehicle 1 is caused to travel. The controller 14 controls the torque generator 15 and the steering system 16 to cause the vehicle 1 to autonomously travel along the travel route indicated by the route information 31a at the slow speed represented by the target value received from the first-travel requirement determiner 32a. The reason for setting of such a speed limit is that in the first travel in which the state of the road surface on the travel route is unknown, it is preferable to cause the vehicle 1 to autonomously travel at a low speed in order to reduce the change in behavior of the vehicle body. The vehicle 1 autonomously travels slowly on the travel route while confirming its own location and detecting the absence of obstacles.

During travel of the vehicle 1 along the travel route, the storage 31 stores location information detected by the location detector 21 and behavior information detected by the behavior sensor 22 as the past data 31b in which the location information and the behavior information are associated with each other.

The past data 31b may include information related to the state of the vehicle 1 or information related to the surroundings of the vehicle 1 during travel of the vehicle 1. For example, at the start of the first travel, information detected by the load detector 25 is stored as carried load information in the storage 31, and the carried load information is included in the past data 31b. Pieces of information detected by various sensors during the first travel may also be included in the past data 31b. Environment information indicating the environment around the travel route may be included in the past data 31b, and examples of the environment information include weather, atmospheric temperature, wind velocity, and humidity during the travel. The environment information may include not only information acquired during the travel but also information acquired before the travel. For example, weather, atmospheric temperature, and wind velocity on the day before the travel may be included as the environment information indicating the environment around the travel route. The user may input information such as the number of occupants to the instructor 40, and the input information may be sent from the instructor 40 to the communicator 26 together with the route information and stored as a part of the past data 31b in the storage 31.

In first travel S1, autonomous travel of the vehicle 1 is not necessarily required, and the user may drive the vehicle 1 actually and teach the travel route to the vehicle 1.

Planning for Travel S2

Planning for travel S2 is carried out after the past data 31b is stored through first travel S1. In planning for travel S2, the processing circuitry 32 determines a plan for the next travel of the vehicle 1 along the same travel route. Specifically, the processing circuitry 32 determines the control requirement to be imposed on the control target during the next travel of the vehicle 1 along the same travel route. The control requirement is a requirement to be imposed on the control target during travel of the vehicle 1 from the travel start location to the travel end location along the travel route. In the present embodiment, planning for travel S2 is carried out before the start of the next travel along the travel route.

Road Surface Roughness Calculation S13

In planning for travel S2, the road surface roughness calculator 32b calculates, based on the behavior information of the past data 31b, the roughness of the road surface at the location indicated by the location information associated with the behavior information. Specifically, the road surface roughness calculator 32b calculates an indicator of the roughness of the road surface, i.e., an indictor of the degree of unevenness of the road surface, from vehicle speed information and acceleration information included in the behavior information (this indicator will be referred to as "road surface roughness" hereinafter).

Figure 5:
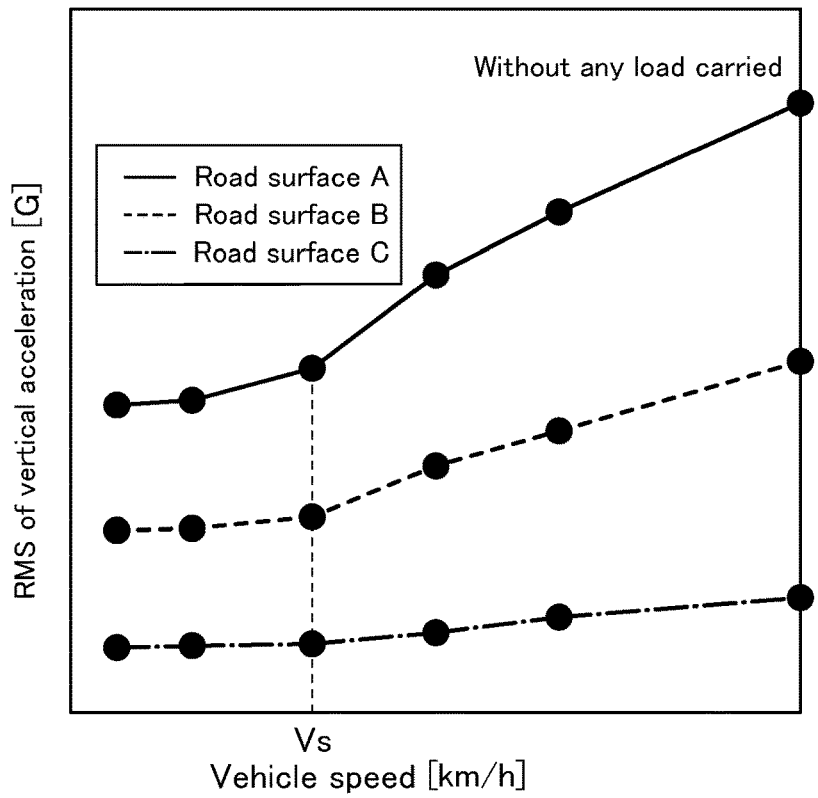
FIG. 5 shows graphs for describing how to calculate a road surface roughness.
Figure 6:
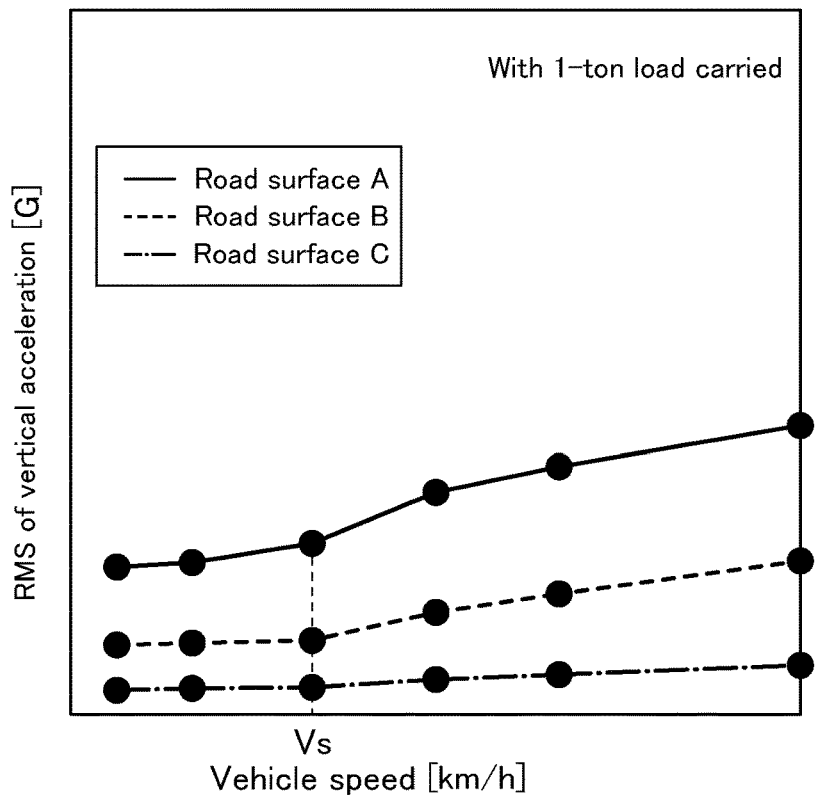
FIG. 6 shows graphs for describing how to calculate a road surface roughness under a loading condition different from that for the graphs of FIG. 5.

The following describes how to calculate the road surface roughness with reference to FIGS. 5 and 6. First, travel simulation was conducted to determine how to calculate the road surface roughness. For this travel simulation, several sets of road surface profile data differing in the degree of road surface unevenness were created. In the travel simulation, the vehicle was caused to travel at a predetermined speed on different road surfaces defined respectively by the several sets of road surface profile data. The degrees of vehicle body vibration observed in the travel simulation were compared to one another.

FIGS. 5 and 6 show results of travel simulation in which the vehicle was caused to travel at a predetermined speed on road surfaces A, B, and C defined respectively by three sets of road surface profile data. As for the degrees of unevenness of the road surfaces A, B, and C created for the travel simulation, the road surface A has the highest degree of unevenness, the road surface B has the second highest degree of unevenness, and the road surface C has the lowest degree of unevenness. That is, among the road surfaces A, B, and C, the road surface A is the roughest, and the road surface C is the smoothest. This was confirmed by calculating the power spectral density (PSD) of each of the road surface profiles. More specifically, for the road surfaces A, B, and C, graphs representing the relationship between the spatial frequency and the profile power spectral density were plotted and compared on the same coordinate system in which the abscissa represents the spatial frequency and the ordinate represents the profile power spectral density. The graph of the road surface A was located above the graph of the road surface B, and the graph of the road surface B was located above the graph of the road surface C. This led to the conclusion that the road surface C is the smoothest road surface, the road surface B is the second smoothest road surface, and the road surface A is the roughest road surface.

In the graphs of FIGS. 5 and 6, the abscissa represents the speed of the vehicle during travel on the three road surfaces A, B, and C, and the ordinate represents the root mean square (RMS) of the vertical acceleration of the vehicle body during travel on the three road surfaces A, B, and C. The root mean square of the vertical acceleration represents the degree of vehicle body vibration. Hereinafter, the root mean square of the vertical acceleration of the vehicle body will be referred to as "vertical acceleration RMS" for convenience.

The results shown in FIGS. 5 and 6 are those obtained under different loading conditions. FIG. 5 shows a result of simulation in which the vehicle was caused to travel without any carried load, and FIG. 6 shows a result of simulation in which the vehicle was caused to travel with a 1-ton load carried.

The graphs of FIGS. 5 and 6 reveal, for example, that when the vehicle speed is below Vs, the vertical acceleration RMS is generally constant regardless of the vehicle speed for all of the road surfaces A, B, and C. The graphs of FIGS. 5 and 6 further reveal that when the vehicle speed is above Vs, the vertical acceleration RMS increases with increasing vehicle speed for all of the road surfaces A, B, and C. The rate of increase in vertical acceleration RMS with increasing vehicle speed is different for each of the road surfaces A, B, and C.

From these results, there can be derived an expression describing the relationship among the vehicle speed, vertical acceleration RMS, and road surface roughness. In case that the vehicle speed and vertical acceleration RMS are known, the road surface roughness, i.e., the degree of unevenness, can be estimated using the derived relational expression. In this manner, the road surface roughness calculator $32b$ calculates the road surface roughness. For example, the road surface roughness calculator $32b$ converts the vertical acceleration RMS of the past data $31b$ (this vertical acceleration RMS is that obtained for travel of the vehicle 1 at the vehicle speed of the past data $31b$) to the vertical acceleration RMS of the vehicle body which would be obtained for travel of the vehicle 1 at a given reference speed (e.g., the vehicle speed Vs indicated in the graphs). The road surface roughness calculator $32b$ uses the thus calculated vertical acceleration RMS as an indicator of the roughness of the road surface. For example, when the vehicle speed is below Vs, the road surface roughness calculator $32b$ uses the vertical acceleration RMS itself as the road surface roughness. For example, when the vehicle speed is equal to or above Vs, the road surface roughness calculator $32b$ corrects the vertical acceleration RMS such that the vertical acceleration RMS decreases with increasing vehicle speed, and uses the corrected vertical acceleration RMS as the road surface roughness. Further, as described later, the road surface roughness is corrected based on the loading weight.

Regarding the behavior of the vehicle, as seen from FIGS. 5 and 6, the greater the sprung weight of the vehicle (inclusive of the weight of carried loads) is, the lower the vertical acceleration RMS is. In case that the loading condition in the travel for acquiring the past data and the loading condition in the next travel are different, the road surface roughness calculator $32b$ calculates the road surface roughness taking into account the difference between the loading conditions. In case that the loading weight in the next travel is greater than the loading weight in the travel for acquiring the past data, the road surface roughness calculator $32b$ makes a correction such that the road surface roughness in the next travel is reduced. Specifically, in the present embodiment, the calculated vertical acceleration RMS and the sprung weight of the vehicle are inversely proportional to each other and, using this relationship, the road surface roughness calculator $32b$ corrects the calculated vertical acceleration RMS based on the carried load information included in the past data and information related to carried loads in the next travel.

The information related to carried loads in the next travel is designated, for example, by the user. For example, the user may operate the instructor 40 to input the contents or weight of the loads to be carried in the next ravel, and the input information may be sent from the instructor 40 to the communicator 26 wirelessly or by wire together with the route information. The road surface roughness calculator $32b$ may use the carried load-related information received from the instructor 40 as the information related to carried loads in the next travel. Alternatively, the road surface roughness calculator $32b$ may use, as the information related to carried loads in the next travel, information related to the weight as detected by the load detector 25 for the loads currently carried on the vehicle body 2.

After the calculation of the road surface roughness, the upper speed limit determiner $32d$ determines an upper speed limit Vlim1 based on the road surface roughness (S14). The upper speed limit determiner $32d$ further determines an upper speed limit Vlim2 as a function of the curvature of the travel route (S15). Subsequently, the target speed determiner $32e$ determines a target speed Vo reasonable for travel along the travel route based on the upper speed limits Vlim1 and Vlim2 (S16). The determined target speed Vo is used as the control requirement to be imposed on the torque generator 15. Hereinafter, the determination of the upper speed limit Vlim1 as a function of the road surface roughness, the determination of the upper speed limit Vlim2 as a function of the curvature of the travel route, and the determination of the target speed Vo based on the upper speed limits Vlim1 and Vlim2 will be described with reference to FIG. 7.

Figure 7:
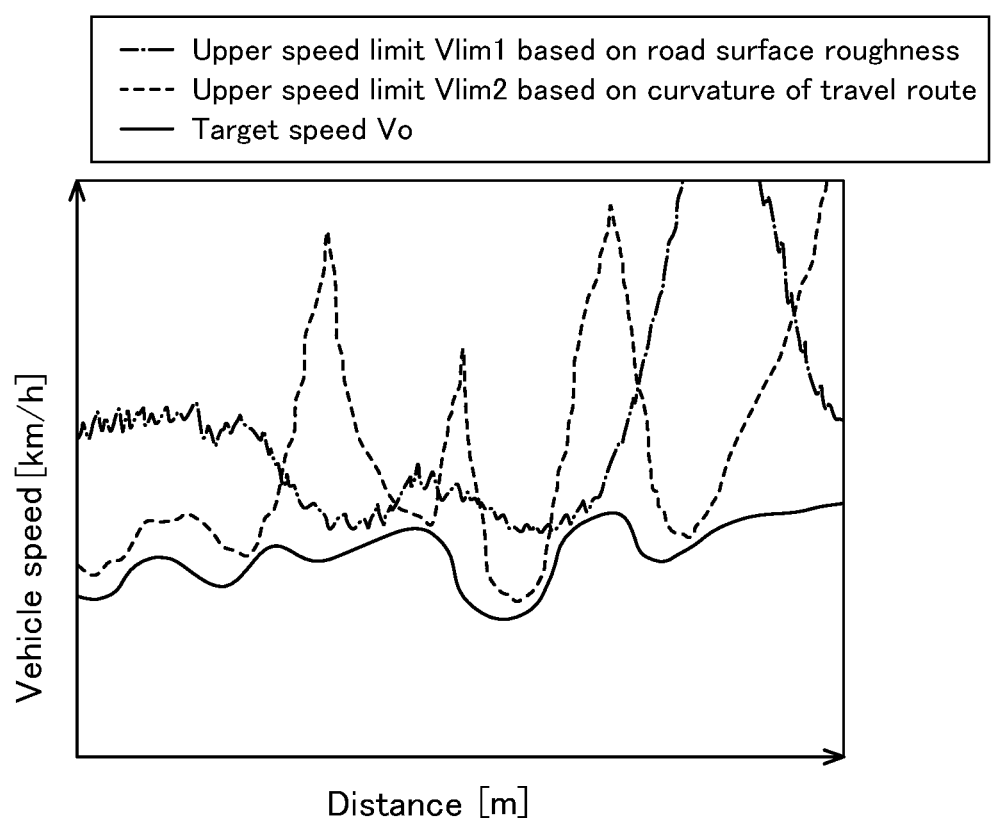
FIG. 7 shows graphs for describing how to determine a target speed at which the vehicle is caused to travel along a travel route.

FIG. 7 shows graphs for describing how to determine the target speed Vo at which the vehicle is caused to travel along the travel route. The abscissa of FIG. 7 represents the location on the travel route. In FIG. 7, the location on the travel route is indicated by the distance that the vehicle travels along the travel route from a point on the travel route. The ordinate of FIG. 7 represents the vehicle speed. The dashed-dotted line represents the upper speed limit Vlim1 determined by the upper speed limit determiner 32d based on the road surface roughness. The dashed line represents the upper speed limit Vlim2 determined by the upper speed limit determiner 32d based on the curvature of the travel route. The solid line represents the target speed Vo determined by the target speed determiner 32e based on the upper speed limits Vlim1 and Vlim2.

Determination of Upper Speed Limit as a Function of Road Surface Roughness S14

After the calculation of the road surface roughness, the upper speed limit determiner 32d determines the upper speed limit Vlim1 based on the road surface roughness calculated by the road surface roughness calculator 32b from the behavior information of the past data 31b. The upper speed limit Vlim1 is an upper speed limit at the location indicated by the location information associated with the behavior information. The speed of the vehicle 1 is decreased with increasing road surface roughness, i.e., with increasing degree of unevenness of the road surface, and thus the vertical acceleration RMS can be decreased. In the present embodiment, the upper speed limit determiner 32d determines the upper speed limit Vlim1 such that the upper speed limit Vlim1 is inversely proportional to the road surface roughness calculated by the road surface roughness calculator 32b. Specifically, the upper speed limit determiner 32d multiplies the reciprocal of the road surface roughness by a given coefficient and determines the resulting value as the upper speed limit Vlim1.

Determination of Upper Speed Limit as a Function of Curvature of Travel Route S15

When taking a curve with a small radius of curvature on the travel route, the vehicle 1 is caused to travel at a lower speed than when taking a curve with a large radius of curvature, even if the roughness of the road surface is small. This can prevent skidding of the vehicle. In the present embodiment, the upper speed limit determiner 32d determines the upper speed limit Vlim2 in view of the curvature of the travel route in addition to determining the upper speed limit Vlim1. Specifically, the route curvature calculator 32c calculates the curvature of the travel route indicated by the route information 31a. Based on the calculated road surface roughness and the calculated curvature of the travel route, the upper speed limit determiner 32d determines the upper speed limit Vlim2 at the location indicated by the location information associated with the behavior information.

More specifically, vehicle skidding can be reliably prevented by decreasing the speed of the vehicle 1 with decreasing radius of curvature of the travel route. In the present embodiment, the upper speed limit determiner 32d determines the upper speed limit Vlim2 such that the upper speed limit Vlim2 is proportional to the square root of the radius of curvature of the travel route.

In general, the larger the road surface roughness is, the smaller the ground contact area is. Thus, vehicle skidding is more likely to occur on a curve with a large road surface roughness than on a curve with a small road surface roughness even if the two curves have the same radius of curvature. In the present embodiment, the upper speed limit determiner 32d determines the upper speed limit Vlim2 taking into account the road surface roughness calculated by the road surface roughness calculator 32b. For example, the upper speed limit determiner 32d determines the upper speed limit Vlim2 such that the upper speed limit Vlim2 is proportional to the root square of the radius of curvature of the travel route and inversely proportional to the square root of the road surface roughness calculated by the road surface roughness calculator 32b. The upper speed limit determiner 32d may determine the upper speed limit Vlim2 without using the road surface roughness calculated by the road surface roughness calculator 32b.

Target Speed Determination S16

The target speed determiner 32e determines the target speed Vo reasonable for travel along the travel route based on the upper speed limits Vlim1 and Vlim2. The determined target speed Vo is used as the control requirement to be imposed on the torque generator 15. In the present embodiment, the target speed determiner 32e determines the target speed Vo to smoothly accelerate and decelerate the vehicle, rather than merely to prevent the vehicle speed from exceeding the upper speed limits Vlim1 and Vlim2.

For example, there may be a situation where accelerating the vehicle appears to be reasonable in view of the state of the current location of the vehicle. However, even in such a situation, accelerating the vehicle is not reasonable if the vehicle will take a sharp curve or pass through an uneven road surface at a location slightly ahead of the current location. Thus, in determining the target speed Vo for one location on the travel route, the target speed determiner 32e takes into account not only the upper speed limits Vlim1 and Vlim2 at the one location but also the upper speed limits Vlim1 and Vlim2 at locations included in a certain extent of zone ahead of the one location. In other words, in determining the control requirement to be imposed on the control target at a travel location of the vehicle, the target speed determine 32e takes into account the pieces of behavior information associated with the pieces of location information indicating other locations ahead of the travel location in the travel direction.

For example, the target speed determiner 32e simulates travel of the vehicle from the start location to the goal location along the travel route on the assumption that the initial speed at the start location is zero, and determines whether to accelerate or decelerate the vehicle at each of a series of locations on the travel route. In this process, the target speed determiner 32e determines a reference zone for each location on the travel route, the reference zone being a given extent of zone extending from the location in the travel direction. The extent of the reference zone varies from location to location on the travel route. The reference zone for each location on the travel route is determined such that the higher the vehicle speed at the location is, the greater the extent of the reference zone is.

For each location, the target speed determiner 32e compares the current speed at the location to the lowest of the upper speed limits Vlim1 and Vlim2 determined for the other locations included in the reference zone (the lowest of the upper speed limits will be referred to as "reference upper speed limit" hereinafter). In case that the current speed is higher than the reference upper speed limit, the target speed determiner 32e determines to decelerate the vehicle from the current speed. In case that the current speed is lower than the reference upper speed limit, the target speed determiner 32e determines to accelerate the vehicle from the current speed.

In determining whether to accelerate or decelerate the vehicle at a series of locations on the travel route, the target speed determiner 32e further determines the acceleration or deceleration for each location. The acceleration or deceleration at each location on the travel route is determined using a predetermined equation based on the speed at the location and the radius of curvature of the travel route at the location. For example, the target speed determiner 32e determines the acceleration or deceleration at each location on the travel route such that the smaller the radius of curvature at the location is, the smaller the absolute value of the acceleration or deceleration is. For example, the target speed determiner 32e determines the acceleration or deceleration at each location on the travel route such that the higher the speed at the location is, the smaller the absolute value of the acceleration or deceleration is.

As described above, the target speed determiner 32e repeats the determination of whether to accelerate or decelerate the vehicle at a series of locations on the travel route during travel from the start location to the goal location along the travel route, and determines the thus obtained speed values as the target speed values.

Travel According to Plan S3

Autonomous Travel at Determined Speed S16

In travel according to plan S3, the controller 14 controls the control targets, i.e., the torque generator 15 and steering system 16, based on the location detected by the location detector 21 and the control requirement determined by the control requirement determiner 30. That is, the controller 14 actually causes the vehicle 1 to autonomously travel based on the target speed determined in planning for travel S2.

During travel of the vehicle 1 along the travel route, the storage 31 stores location information detected by the location detector 21 and behavior information detected by the behavior sensor 22 as the latest past data 31b in which the location information and the behavior information are associated with each other. The stored past data 31b is used to determine the control requirement in the next planning for travel S2. Thus, as shown in FIG. 2, the past data 31b is accumulated in the storage 31 for every travel along the travel route. Once the latest past data 31b is stored, the past data 31b previously stored may be deleted.

The road surface roughness is corrected based on the loading condition in road surface roughness calculation S13, and thus the control requirement is determined taking into account the loading condition. The correcting the control requirement based on the loading condition may be performed in travel according to plan S3 or in target speed determination S16.

In the present embodiment, as described above, the control requirement to be imposed on the control target is determined based on the behavior of the vehicle body 2 in past travel. With the use of the predetermined control requirement for control of the control target, control delay can be more reliably avoided than in the case where the control requirement to be imposed on the control target is determined based on the vehicle body behavior detected during travel in real time and is used for control of the control target.

The rough terrain vehicle 1 can detect the state of the road surface using the environment recognition sensor 10, indeed. However, for example, in case that the vehicle 1 is slowed down upon detection by the environment recognition sensor 10 of an obstacle such as a muddy pool, bump, or dip on the road surface immediately before the vehicle 1 reaches the obstacle, the vehicle 1 could fail to avoid mud splash or violent vibration of the vehicle body. Additionally, causing the rough terrain vehicle 1 to travel at a constant slow speed leads to a low time efficiency of movement. In the present embodiment, where the target speed is determined based on the behavior of the vehicle body 2 in past travel, the vehicle can be caused to travel with a high time efficiency of movement while reducing the change in behavior of the vehicle body.

In the present embodiment, the control requirement to be imposed on the control target at a travel location of the rough terrain vehicle 1 is determined taking into account the pieces of behavior information associated with the pieces of location information indicating other locations ahead of the travel location in the travel direction of the rough terrain vehicle 1, in particular taking into the upper speed limits Vlim1 and Vlim2 determined for locations included in the reference zone determined for the travel location. Thus, the vehicle behavior at locations through which the vehicle will pass in the future can be reflected in the vehicle control. Consequently, the control requirement determined can be such as to prevent the behavior from changing abruptly from travel location to travel location.

In the present embodiment, the road surface roughness calculator 32b calculates an indicator of the roughness of the road surface from vehicle speed information and acceleration information included in the behavior information, and the road surface roughness calculated is used to determine the control requirement. Thus, the control requirement determined can be suitable for the state of the road surface.

In the present embodiment, the behavior information includes information related to the vertical acceleration of the vehicle body 2. This makes it easier to know the state of the road surface at different locations on the travel route.

In the present embodiment, the control requirement includes a target value related to the longitudinal motion of the rough terrain vehicle 1, in particular a target speed, at the location indicated by the location information of the past data. Thus, the control requirement determined can be such as to allow the rough terrain vehicle 1 to travel at a speed suitable for the state of the road surface. Additionally, the control requirement determined can be such as to allow an autonomous vehicle to travel autonomously at a speed suitable for the state of the road surface.

In the present embodiment, the upper speed limit determiner 32d determines the upper speed limits Vlim1 and Vlim2, and then the target speed determiner 32e determines a target speed reasonable for travel along the travel route based on the determined upper speed limits Vlim1 and Vlim2. Thus, the control requirement determined can be such as to prevent the vehicle from having an excessive speed.

In the present embodiment, the pieces of location information included in the past data indicate locations on a predetermined travel route, and the control requirement is determined before the start of travel along the travel route. Thus, the user can, before travel of the rough terrain vehicle 1, confirm what kind of control will be performed on the control target.

In the present embodiment, the upper speed limit determiner 32d determines the upper speed limit Vlim2 in view of the curvature of the travel route, and the target speed determiner 32e determines the target speed Vo based on the determined upper speed limit Vlim2. Thus, the control requirement determined can be such as to prevent the vehicle from having an excessive speed at a location with a small radius of curvature on the travel route.

In the present embodiment, the target speed determiner 32e determines the target speed at one location based on the lowest of the upper speed limits Vlim1 and Vlim2 determined for other locations included in the reference zone determined for the one location. Thus, the control requirement determined can be such as to allow the vehicle to travel with a lower acceleration than in the case where the target speed at each location on the travel route is determined only based on the upper speed limit at the location.

In the present embodiment, the latest past data is used to determine the control requirement. Thus, the control requirement determined can be suitable for the current state of the road surface.

In the present embodiment, there is received information related to a factor that influences the braking distance of the rough terrain vehicle 1 and that is other than the speed of the rough terrain vehicle 1, in particular information related to loads carried on the rough terrain vehicle 1, and the control requirement is determined taking into account the information related to the carried loads. The control requirement can be made more suitable by taking into account the braking distance-influencing factor other than the speed in determining the control requirement.

OTHER EMBODIMENTS

Many modifications and other embodiments of the present disclosure will be apparent to those skilled in the art from the foregoing description. Accordingly, the foregoing description is to be construed as illustrative only, and is provided for the purpose of teaching those skilled in the art the best mode for implementing the technology of the present disclosure. The details of the structure and/or function may be varied substantially without departing from the scope of the disclosure.

For example, the rough terrain vehicle is not limited to the configuration described in the above embodiment. Although in the above embodiment the rough terrain vehicle is switchable between a two-wheel-drive mode and a four-wheel-drive mode, the rough terrain vehicle may be a two-wheel-drive vehicle or four-wheel-drive vehicle. The rough terrain vehicle may be devoid of a part of the elements shown in FIG. 2. For example, the rough terrain vehicle may be devoid of the environment recognition sensor 10.

For example, the rough terrain vehicle may include a differential that permits the wheels to rotate at different speeds. The rough terrain vehicle may be switchable between a differential unlocked state where the wheels are permitted to rotate at different speeds and a differential locked state where the wheels are prevented from rotating at different speeds. That is, the rough terrain vehicle may include a differential locking/unlocking device.

The rough terrain vehicle may be a three-wheeled vehicle having one front or rear wheel. Although in the above embodiment a utility vehicle has been described as an example of the rough terrain vehicle, the rough terrain vehicle may be a caterpillar-type or wheeled truck for rough terrains or may be an agricultural tractor or a traveling lawnmower. The suspensions supporting the vehicle body need not be electronically controlled suspensions.

The location detector may include, in addition to or instead of the GNSS receiver, a device that detects the geographic location of the vehicle body in a different manner than the GNSS receiver. For example, the location detector may be a device for autonomous navigation such as a gyro sensor. For example, the location detector may be a device that performs base station positioning in which the location of the vehicle body is identified by calculating distances from given base stations to the vehicle body. For example, the location detector may be a combination of a steering angle sensor and a vehicle speed sensor.

Although in the above embodiment the latest past data is described as data for use in planning for travel S2, the control requirement determiner need not use the latest past data in order to determine the control requirement. The control requirement determiner may use different sets of past data stored in the storage in order to determine the control requirement. The control requirement determiner may select past data suitable for the next travel from among different sets of past data stored in the storage. For example, in the case where the next travel will take place in rain, the control requirement determiner may select past data obtained through travel of the vehicle in rain from among different sets of past data stored in the storage. To this end, the past data may include information indicating the weather during travel. The past data to be used by the control requirement determiner may be chosen by the user from among different sets of past data stored in the storage.

Although in the above embodiment the route information is sent from the instructor 40 to the vehicle 1 in first travel S1, the travel route need not be designated through the instructor 40. For example, the travel route may be designated by the user through a user interface, such as a display device or an operation device, of the vehicle 1.

In first travel S1, the vehicle need not be caused to travel autonomously. For example, a driver may drive the vehicle 1 along a route, and the route may be designated as a travel route of the vehicle 1. In this case, through the manual driving of the vehicle 1 by the driver, the designation of the travel route and the acquisition of the past data during travel along the travel route can be accomplished at the same time.

Although in the above embodiment the control requirement determiner 30 determines a target speed for travel along the travel route as the control requirement in first travel S1, the control requirement is not limited to the target speed. For example, the control requirement may be one to be imposed on the suspensions 17. In travel according to plan S3, the vehicle need not be caused to travel autonomously.

Although in the above embodiment the rough terrain vehicle is an autonomous vehicle, the rough terrain vehicle may be a non-autonomous vehicle, i.e., a manually driven vehicle. In this case, for example, the control requirement determiner can serve to support driving operations of the driver. Specifically, the control requirement determiner can determine a control requirement for limiting a control command value generated according to the amount of driver's operation. For example, the control requirement determiner may determine an upper speed limit or an upper acceleration limit of the vehicle as the control requirement. In this case, upon a user's operation to accelerate the vehicle, the controller controls the control target (e.g., the engine) to limit the accelerating of the vehicle such that the speed or acceleration of the vehicle does not exceed the upper speed or acceleration limit imposed as the control requirement.

The vehicle 1 may be a partially self-driving vehicle in which only a part of driving operations performed by the driver to cause the vehicle 1 to travel can be automated.

The behavior information is not limited to those described in the above embodiment. For example, the behavior information may include at least one of information related to the travel speed of the vehicle, information related to the vertical acceleration of the vehicle body, information related to the lateral acceleration of the vehicle body, information related to the steering angle, or information related to the suspension stroke.

Although in the above embodiment the loading weight-related information detected by the load detector 25 is stored as the carried load information in the storage 31, the carried load information related to the weight of the loads carried on the vehicle body need not be information detected by the load detector 25. For example, the carried load information may be information from which the sprung weight of the vehicle can be estimated. For example, the carried load information may be the number or total weight of occupants or the number or total weight of carried loads other than the occupants. The carried load information need not be information detected by any device mounted on the vehicle, and may be, for example, information input to the instructor by the user.

The location detected by the location detector need not be a location on any predetermined travel route. For example, the location detected by the location detector may be a location identified within a tolerance of several hundreds of meters. For example, the location detected by the location detector may be an area. That is, for example, the location detector may be used to determine in which of predetermined areas the vehicle is located. In this case, the location information included in the past data is information indicating an area, and the control requirement determiner determines, based on the behavior information associated with the location information of the past data, the control requirement to be imposed on the control target in the area indicated by the location information of the past data during travel of the rough terrain vehicle.

However, the behavior of the vehicle body on the same road surface can vary depending on the travel direction. Thus, the location information included in the past data preferably indicates a location on a travel route.

The past data used by the control requirement determiner to determine the control requirement to be imposed on the control target during travel of the rough terrain vehicle may be data acquired by another rough terrain vehicle. For example, the control requirement determiner may use past data acquired through travel of a rough terrain vehicle of a user in order to determine the control requirement to be imposed on a control target of a rough terrain vehicle of another user. For example, sets of past data obtained through travel of rough terrain vehicles owned by different users may be accumulated in one server device. Past data suitable for planning for travel of a vehicle may be selected from among the sets of past data accumulated in the server device (for example, past data obtained through travel of another vehicle of the same model or past data obtained through travel of another vehicle under the same loading condition may be selected).

Although how to calculate the road surface roughness is described in the above embodiment, the described way of calculation is merely an example. The road surface roughness may be calculated from the past data in another way.

Although in the above embodiment the control target that influences the behavior of the vehicle body is described as including the torque generator 15, the steering system 16, and the suspension 17, the control target may include at least one of the torque generator 15, the steering system 16, or the suspension 17. The control target that influences the behavior of the vehicle body may be other than the torque generator, the steering system, and the electronically controlled suspension. For example, the control target may be at least one of a clutch device, a gear shifting device, a device for switching between two-wheel-drive and four-wheel-drive modes, a differential locking/unlocking device, or an electronically controlled stabilizer. The components mentioned above are merely examples of the control target, and the control target may be another actuator that can influence the motion of the vehicle body.

The control requirement described in the above embodiment is also merely an example. For example, the control requirement to be imposed on the torque generator need not include the target value related to the longitudinal motion of the rough terrain vehicle at the location indicated by the location information of the past data, and may include what is other than the target value related to the longitudinal motion of the rough terrain vehicle. For example, the control requirement to be imposed on the torque generator need not include the target speed of the rough terrain vehicle. The control requirement to be imposed on the torque generator may be an upper speed limit of the rough terrain vehicle. The control requirement to be imposed on the torque generator may be a lower speed limit of the rough terrain vehicle. In other words, the control requirement may be a permissible travel speed range.

For example, the user may choose what kind of control requirement is determined based on the behavior information.

The control requirement can vary depending on the control target on which the control requirement is to be imposed. For example, the control requirement may be a command value to be sent to the control target or the range of the command value to be sent to the control target.

For example, in the case where the control target includes the steering system, the control requirement to be imposed on the steering system may be related to the range of steering amount. For example, the control requirement determiner may determine the steering amount such that the larger the road surface roughness is, the more restricted is abrupt change in steering amount.

For example, in the case where the control target includes the electronically controlled suspension, the control requirement to be imposed on the electronically controlled suspension may be related to the damping coefficient of the suspension. For example, the control requirement may be to adjust the suspension to a damping coefficient appropriate for the road surface roughness. In order to prevent transmission of vibration to the vehicle body, the control requirement determiner may determine the damping coefficient such that the damping coefficient increases continuously or stepwise with increasing road surface roughness.

For example, in the case where the control target includes the device for switching between two-wheel-drive and four-wheel-drive modes, the control requirement to be imposed on the device for switching between two-wheel-drive and four-wheel-drive modes may be to select a drive mode appropriate for the road surface roughness. That is, the controller mounted on a vehicle switchable between two-wheel-drive and four-wheel-drive modes may switch the vehicle between the two-wheel-drive and four-wheel-drive modes based on the control requirement determined as a function of the road surface roughness calculated. The control requirement determiner may determine the control requirement such that the vehicle is switched to the four-wheel-drive mode in case that the calculated road surface roughness is in a predetermined range over which rear wheel spin can occur due to the roughness of the road surface. For example, in the case where the control target further includes the torque generator in addition to the device for switching between two-wheel-drive and four-wheel-drive modes, the upper travel speed limit determined as the control requirement to be imposed on the torque generator in the fourwheel-drive mode may be higher than the upper travel speed limit to be imposed in the two-wheel-drive mode.

For example, in the case where the control target includes the differential locking/unlocking device, the control requirement to be imposed on the differential locking/unlocking device may be to bring the differential into a state appropriate for the road surface roughness. That is, the controller mounted on a vehicle switchable between a differential locked state and a differential unlocked state may switch the vehicle between the differential locked and unlocked states based on the control requirement determined as a function of the road surface roughness calculated. The control requirement determiner may determine the control requirement such that the vehicle is switched to the differential locked state in case that the calculated road surface roughness is in a predetermined range over which rear wheel spin can occur due to the roughness of the road surface.

The control requirement determiner may, based on the past data, determine the control requirement such that the above switching to the four-wheel drive mode or the differential locked state takes place at a location where wheel spin occurred in the past. In this case, the behavior information included in the past data can include information related to wheel spin.

For example, in the case where the control target includes the engine or the gear-shift clutch, the control requirement to be imposed on the engine or gear-shift clutch may be such as to prevent rapid rotation of the wheels.

In the above embodiment, the behavior sensor is described as including a vehicle speed sensor and an acceleration sensor, and information related to the travel speed of the vehicle 1 and information related to the vertical acceleration of the vehicle body 2 are mentioned as examples of the behavior information included in the past data. However, the behavior information included in the past data is not limited to these pieces of information mentioned as examples. The behavior information included in the past data may be either the information related to the travel speed of the vehicle body or the information related to the vertical acceleration of the vehicle body or may be other than these pieces of information. For example, the behavior information can include information related to the rotational speeds of the wheels. The behavior information can include information indicating that wheel spin of any of the wheels occurred or information indicating that rapid rotation of any of the wheels occurred.

The behavior information included in the past data can include information related to the inclination of the travel road surface. The behavior information included in the past data can include information related to the heights at which the left and right wheels contact the ground. These pieces of information such as the inclination of the travel road surface may be obtained through detection of the load distribution between the left and right wheels and estimation based on the detected information. That is, the behavior sensor may be a load detector that detects the load distribution between the left and right wheels. The load detector may be the stroke sensor that detects the amount of extension/contraction of the absorber described above. The behavior sensor may be a gyro sensor.

The information related to the inclination of the travel road surface or the information related to the heights at which the left and right wheels contact the ground may be used for correction of the control requirement. For example, in case that, during turning of the vehicle, the outer wheels are located below the inner wheels, the control requirement may be corrected to decrease the travel speed. The control requirement may be corrected such that the travel speed during turning decreases with increasing weight of the loads carried on the cargo carrier and increasing height at which the center of gravity of the vehicle is located.

Although in the above embodiment the control requirement determiner 30 is mounted on the rough terrain vehicle 1, the control requirement determiner need not be mounted on any rough terrain vehicle. The control requirement determiner may be a server device. The control requirement determiner may be a personal computer, a tablet terminal, or a smartphone. For example, the instructor 40 described in the above embodiment may serve also as the control requirement determiner.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known hardware which is programmed or configured to carry out the recited functionality. When the hardware is a processor which may be considered a type of circuitry, the circuitry, means, or units are a combination of hardware and software, the software being used to configure the hardware and/or processor.

Various programs disclosed herein are stored in a storage. The storage is a readable and writable device or readable device built in or externally connected to a computer, and may be, for example, a hard disk, a flash memory, or an optical disk. The programs stored in the storage may be executed by a computer to which the storage is directly connected or may be downloaded into and executed by a computer connected to the storage via a network (e.g., the Internet).

A control requirement determiner according to one aspect of the present disclosure is a control requirement determiner that determines a control requirement to be imposed on a control target that influences a behavior of a vehicle body of a rough terrain vehicle during travel of the rough terrain vehicle, the control requirement determiner including: a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past; and processing circuitry that determines, based on the behavior information associated with the location information of the past data, the control requirement to be imposed on the control target at the location indicated by the location information of the past data during travel of the rough terrain vehicle. The vehicle that traveled in the past may be the rough terrain vehicle or another vehicle.

In the above configuration, the control requirement to be imposed on the control target is determined based on the behavior of the vehicle body in past travel. With the use of the predetermined control requirement for control of the control target, control delay can be more reliably avoided than in the case where the control requirement to be imposed on the control target is determined only based on the vehicle body behavior detected during travel in real time and is used for control of the control target.

In determining the control requirement to be imposed on the control target at a travel location of the rough terrain vehicle, the processing circuitry may take into account the behavior information associated with the location information indicating another location ahead of the travel location in a travel direction of the rough terrain vehicle. In this configuration, the vehicle behavior at locations through which the vehicle will pass in the future can be reflected in the vehicle control. As such, the control requirement determined can be such as to prevent the behavior from changing abruptly from travel location to travel location. For example, in the case where an area where the speed is to be limited lies ahead in the travel direction, the vehicle speed can be decreased beforehand to avoid abrupt deceleration and therefore wheel slip arising from abrupt deceleration.

The past data may include: the location information indicating a travel location through which the rough terrain vehicle traveled in the past; and the behavior information related to a behavior exhibited by the vehicle body of the rough terrain vehicle at the travel location, and in planning for next travel in which the rough terrain vehicle will pass through the same travel location, the processing circuitry may determine, based on the behavior information associated with the location information of the past data, the control requirement to be imposed on the control target at the travel location during the next travel of the rough terrain vehicle. In this configuration, the vehicle that was caused to travel for acquisition of the past data is the same as the vehicle for which the control requirement to be imposed on the control target is determined, and thus the control requirement determined can be more suitable. For example, the vehicle weight and the suspension characteristics can easily be made the same as those in the past travel, and reduction in accuracy which could arise from the difference between the vehicles can be prevented. For example, the margin to be provided in view of the difference in condition can be reduced, and the requirement employed can be such as to increase the upper speed limit. Additionally, an abrupt change in vehicle body behavior which could arise from the difference in condition can be prevented.

The processing circuitry may determine, based on the behavior information of the past data, a roughness of a road surface at the location indicated by the location information associated with the behavior information, and may determine, based on the calculated roughness, the control requirement to be imposed on the control target at the location indicated by the location information of the past data. In this configuration, where the roughness of the road surface is determined, the control requirement determined can be suitable for the state of the road surface.

The behavior information may include information related to a vertical acceleration of the vehicle body. In this configuration, where the information related to the vertical acceleration of the vehicle body is used as the behavior information, the use of this information makes it easier to know the state of the road surface at different locations.

The control target may be a torque generator that generates a torque to be transmitted to a drive wheel of the rough terrain vehicle, and the control requirement may include a target value related to a longitudinal motion of the rough terrain vehicle at the location indicated by the location information of the past data. In this configuration, the control requirement determined can be such as to allow the rough terrain vehicle to travel at a speed suitable for the state of the road surface. For example, the target value related to the longitudinal motion is a target value related to the speed or the acceleration/deceleration of the vehicle. For example, the target value related to the longitudinal motion may be a target speed of the vehicle or a torque command value sent to the torque generator.

The rough terrain vehicle may be an autonomous vehicle, and the control requirement may include a target speed of the rough terrain vehicle at the location indicated by the location information of the past data. In this configuration, the control requirement determined can be such as to allow the autonomous vehicle to travel autonomously at a speed suitable for the state of the road surface.

The processing circuitry may determine, based on the behavior information of the past data, an upper speed limit at the location indicated by the location information associated with the behavior information, and may determine, based on the upper speed limit, a target speed of the rough terrain vehicle at the location indicated by the location information of the past data. In this configuration, the control requirement determined can be such as to prevent the rough terrain vehicle from having an excessive speed.

The pieces of location information may indicate locations on a predetermined travel route, and before travel along the travel route, the processing circuitry may determine the control requirement to be imposed on the control target during travel from a travel start location to a travel end location along the travel route. In this configuration, where the travel route is predetermined, it is easier to acquire the past data. Additionally, since the control requirement is determined before the start of travel along the travel route, the user can, before travel of the rough terrain vehicle, confirm what kind of control will be performed on the control target.

The processing circuitry may calculate a radius of curvature at each of the locations on the travel route, and may determine the control requirement based on the radii of curvature and the pieces of behavior information associated with the pieces of location information of the past data. In this configuration, the control requirement determined can be such as to prevent the rough terrain vehicle from having an excessive speed at a location with a small radius of curvature.

The processing circuitry may determine an upper speed limit at each of the locations indicated by the pieces of location information of the past data based on the pieces of behavior information associated with the pieces of location information of the past data, may determine a reference zone for each location on the travel route, the reference zone being a given extent of zone extending from the location in a travel direction of the rough terrain vehicle, and may determine a target speed at each location on the travel route based on the lowest of the upper speed limits determined for the locations included in the reference zone. In this configuration, where the control requirement to be imposed at each location on the travel rout is determined using upper speed limits in a given extent of zone extending from the location in the travel direction, the control requirement determined can be such as to allow the vehicle to travel with a lower acceleration than in the case where the target speed at each location on the travel route is determined only based on the upper speed limit at the location.

The rough terrain vehicle may include a location detector that detects the geographic location of the vehicle body and a behavior sensor that detects the behavior of the vehicle body. Every time the rough terrain vehicle travels along the travel route, the storage may store the pieces of location information detected by the location detector and the pieces of behavior information detected by the behavior sensor as the latest past data, and before the rough terrain vehicle travels along the travel route, the processing circuitry may determine the control requirement using the latest past data stored during previous travel of the rough terrain vehicle along the travel route. In this configuration, where the latest past data is used to determine the control requirement, the control requirement determined can be suitable for the current state of the road surface.

The processing circuitry may receive information on a factor influencing a braking distance of the rough terrain vehicle, the factor being other than the speed of the rough terrain vehicle, and the processing circuitry may determine the control requirement based on the behavior information associated with the location information of the past data and the information on the factor. The behavior of the vehicle body of the rough terrain vehicle during travel can change according to the factor that influences the braking distance of the rough terrain vehicle and that is other than the speed of the rough terrain vehicle. In this configuration, the control requirement can be made more suitable by taking into account the braking distance-influencing factor other than the speed in determining the control requirement. The factor may be the state of the road surface or the loading weight.

The past data may include carried load information indicating a loading state related to a weight of a load carried on the vehicle body of the vehicle that traveled in the past, and in determining the control requirement to be imposed on the control target at the location indicated by the location information of the past data during travel of the rough terrain vehicle, the processing circuitry may take into account a difference between the loading state indicated by the carried load information of the past data and a current loading state. In this configuration, the control can be accomplished based on the loading state. The carried load information may indicate the number or total weight of occupants or the number or total weight of carried loads other than the occupants. The carried load information may be, for example, information indicating on which portions of the vehicle body the loads are carried. That is, the carried load information may include information related to the weight distribution of the carried loads in the vehicle body. For example, the carried load information may be information indicating that the vehicle body is tilted to the left or right by the carried loads. For example, the carried load information may include the stroke amount of each of the four suspensions.

A rough terrain vehicle according to one aspect of the present disclosure includes: a vehicle body; a control target that influences a behavior of the vehicle body during travel of the rough terrain vehicle; a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information during travel of the vehicle, the vehicle being the rough terrain vehicle or another vehicle; processing circuitry that determines, based on the behavior information associated with the location information of the past data, a control requirement to be imposed on the control target at the location indicated by the location information of the past data during travel of the rough terrain vehicle; a location detector that detects a geographic location of the vehicle body; and a controller that controls the control target based on the location detected by the location detector and the control requirement.

The rough terrain vehicle may further include a behavior sensor that detects information related to a behavior of the vehicle body, and the storage may store location information detected by the location detector and behavior information detected by the behavior sensor as the past data.

A control requirement determining method according to one aspect of the present disclosure is a control requirement determining method for determining a control requirement to be imposed on a control target that influences a behavior of a vehicle body of a rough terrain vehicle during travel of the rough terrain vehicle, the method including: causing a storage to store at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past; and causing processing circuitry to, based on the behavior information associated with the location information of the past data, determine the control requirement to be imposed on the control target at the location indicated by the location information of the past data during travel of the rough terrain vehicle.

In this method, the control requirement to be imposed on the control target is determined based on the behavior of the vehicle body in past travel. With the use of the predetermined control requirement for control of the control target, control delay can be more reliably avoided than in the case where the control requirement to be imposed on the control target is determined only based on the vehicle body behavior detected during travel in real time and is used for control of the control target.

In the control requirement determining method, behavior information detected by a behavior sensor mounted on the rough terrain vehicle to detect the behavior of the vehicle body and a geographical location of the vehicle body at which the behavior information was acquired may be stored as the past data in which the behavior information and the geographical location are associated with each other.

The control target may include a torque generator that generates output power for travel of the rough terrain vehicle. In the storing the past data, in case that the rough terrain vehicle is caused to travel in the absence of the past data previously stored in the storage, the torque generator may be controlled to cause the rough terrain vehicle to travel at an output power level equal to or lower than a given output power level determined irrespective of the past data, and in case that the rough terrain vehicle is caused to travel in the presence of the past data previously stored in the storage, travel of the rough terrain vehicle at an output power level higher than the given output power level may be permitted, and the torque generator may be controlled to cause the rough terrain vehicle to travel at an output power level determined based on the previously stored past data. With this method, suppression of vehicle body vibration and prevention of wheel slip or wheel spin on the road surface can be reliably achieved in first travel for acquiring the past data.

What is claimed is:

1. A control requirement determiner that determines a control requirement to be imposed on a control target that influences a behavior of a vehicle body of a rough terrain vehicle during travel of the rough terrain vehicle, the control requirement determiner comprising:

a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past, the behavior information including vehicle speed information related to a vehicle speed of the vehicle body and acceleration information related to a vertical acceleration of the vehicle body, the past data further including sprung weight information related to a sprung weight of the vehicle, the vehicle being the rough terrain vehicle or another vehicle; and processing circuitry that:
- estimates, based on an equation derived from the vehicle speed information and the acceleration information, a degree of unevenness of a road surface at the location indicated by the location information associated with the behavior information;
- corrects the estimated degree of unevenness of the road surface based on next travel sprung weight information, wherein correcting the estimated degree of unevenness includes reducing the estimated degree of unevenness for heavier vehicles;
- determines, based on the corrected degree of unevenness of the road surface, the control requirement to be imposed on the control target at the location indicated by the location information of the past data during travel of the rough terrain vehicle; and
- imposes the determined control requirement on the control target.

2. The control requirement determiner according to claim 1, wherein in determining the control requirement to be imposed on the control target at a travel location of the rough terrain vehicle, the processing circuitry takes into account the behavior information associated with the location information indicating another location ahead of the travel location in a travel direction of the rough terrain vehicle.

3. The control requirement determiner according to claim 1, wherein
the past data includes: the location information indicating a travel location through which the rough terrain vehicle traveled in the past; and the behavior information related to a behavior exhibited by the vehicle body of the rough terrain vehicle at the travel location, and
in planning for next travel in which the rough terrain vehicle will pass through the same travel location, the processing circuitry determines, based on the behavior information associated with the location information of the past data, the control requirement to be imposed on the control target at the travel location during the next travel of the rough terrain vehicle.

4. The control requirement determiner according to claim 1, wherein
the control target is a torque generator that generates a torque to be transmitted to a drive wheel of the rough terrain vehicle, and
the control requirement includes a target value related to a longitudinal motion of the rough terrain vehicle at the location indicated by the location information of the past data.

5. The control requirement determiner according to claim 4, wherein
the rough terrain vehicle is an autonomous vehicle, and
the control requirement includes a target speed of the rough terrain vehicle at the location indicated by the location information of the past data.

6. The control requirement determiner according to claim 4, wherein
the processing circuitry determines, based on the corrected degree of unevenness of the road surface, an upper speed limit at the location indicated by the location information associated with the behavior information, and
the processing circuitry determines, based on the upper speed limit, a target speed of the rough terrain vehicle at the location indicated by the location information of the past data.

7. The control requirement determiner according to claim 1, wherein
the at least one piece of location information indicates locations on a predetermined travel route, and
before travel along the travel route, the processing circuitry determines the control requirement to be imposed on the control target during travel from a travel start location to a travel end location along the travel route.

8. The control requirement determiner according to claim 7, wherein
the processing circuitry calculates a radius of curvature at each of the locations on the travel route, and
the processing circuitry determines the control requirement based on the radii of curvature and the at least one piece of behavior information associated with the at least one piece of location information of the past data.

9. The control requirement determiner according to claim 7, wherein
the processing circuitry determines an upper speed limit at each of the locations indicated by the at least one piece of location information of the past data based on the at least one piece of behavior information associated with the at least one piece of location information of the past data,
the processing circuitry determines a reference zone for each location on the travel route, the reference zone being a given extent of zone extending from the location in a travel direction of the rough terrain vehicle, and
the processing circuitry determines a target speed at each location on the travel route based on the lowest of the upper speed limits determined for the locations included in the reference zone.

10. The control requirement determiner according to claim 7, wherein
the rough terrain vehicle includes a location detector that detects the geographic location of the vehicle body and a behavior sensor that detects the behavior of the vehicle body,
every time the rough terrain vehicle travels along the travel route, the storage stores the at least one piece of location information detected by the location detector and the at least one piece of behavior information detected by the behavior sensor as the latest past data, and
before the rough terrain vehicle travels along the travel route, the processing circuitry determines the control requirement using the latest past data stored during previous travel of the rough terrain vehicle along the travel route.

11. The control requirement determiner according to claim 1, wherein the processing circuitry receives information on a factor influencing a braking distance of the rough terrain vehicle, the factor being other than the speed of the rough terrain vehicle, and the processing circuitry determines the control requirement based on the behavior information associated with the location information of the past data and the information on the factor.

12. The control requirement determiner according to claim 1, wherein the sprung weight information includes carried load information indicating a loading state related to a weight of a load carried on the vehicle body of the vehicle that traveled in the past, and in determining the control requirement to be imposed on the control target at the location indicated by the location information of the past data during travel of the rough terrain vehicle, the processing circuitry takes into account a difference between the loading state indicated by the carried load information of the past data and a current loading state.

13. The control requirement determiner according to claim 1, wherein the rough terrain vehicle is switchable between a differential unlocked state where wheels of the rough terrain vehicle are permitted to rotate at different speeds and a differential locked state where the wheels are prevented from rotating at different speeds, and the processing circuitry switches the rough terrain vehicle between the differential locked state and the differential unlocked state based on the determined control requirement.

14. The control requirement determiner according to claim 1, wherein the control target includes a suspension supporting the vehicle body.

15. The control requirement determiner according to claim 1, wherein when the vehicle speed is below a specific threshold, the processing circuitry calculates the degree of unevenness of the road surface based on the vehicle speed information and the acceleration information, and when the vehicle speed is equal to or above the specific threshold, the processing circuitry corrects the vertical acceleration such that the vertical acceleration decreases as the vehicle speed increases, and calculates the degree of unevenness of the road surface based on the vehicle speed information and the corrected acceleration information.

16. A rough terrain vehicle comprising
a vehicle body;
a control target that influences a behavior of the vehicle body during travel of the rough terrain vehicle
a storage that stores at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information during travel of the vehicle, the behavior information including vehicle speed information related to a vehicle speed of the vehicle body and acceleration information related to a vertical acceleration of the vehicle body, the past data further including sprung weight information related to a sprung weight of the vehicle, the vehicle being the rough terrain vehicle or another vehicle;
processing circuitry that:

estimates, based on an equation derived from the vehicle speed information and the acceleration information, a degree of unevenness of a road surface at the location indicated by the location information associated with the behavior information;

corrects the estimated degree of unevenness of the road surface based on next travel sprung weight information, wherein correcting the estimated degree of unevenness includes reducing the estimated degree of unevenness for heavier vehicles; and determines, based on the corrected degree of unevenness of the road surface, a control requirement to be imposed on the control target at the location indicated by the location information of the past data during travel of the rough terrain vehicle;

a location detector that detects a current geographic location of the vehicle body; and a controller that controls the control target based on the current geographic location detected by the location detector and the control requirement.

17. The rough terrain vehicle according to claim 16, further comprising a behavior sensor that detects information related to a behavior of the vehicle body, wherein the storage stores location information detected by the location detector and behavior information detected by the behavior sensor as the past data.

18. A control requirement determining method for determining a control requirement to be imposed on a control target that influences a behavior of a vehicle body of a rough terrain vehicle during travel of the rough terrain vehicle, the method comprising:

causing a storage to store at least one piece of location information and at least one piece of behavior information as past data in which the location information and the behavior information are associated with each other, the location information indicating a geographic location, the behavior information being related to a behavior exhibited by a vehicle body of a vehicle at the location indicated by the location information when the vehicle traveled in the past, the behavior information including vehicle speed information related to a vehicle speed of the vehicle body and acceleration information related to a vertical acceleration of the vehicle body, the past data further including sprung weight information related to a sprung weight of the vehicle, the vehicle being the rough terrain vehicle or another vehicle;

causing processing circuitry to estimate, based on an equation derived from the vehicle speed information and the acceleration information, a degree of unevenness of a road surface at the location indicated by the location information associated with the behavior information;

causing the processing circuitry to correct the estimated degree of unevenness of the road surface based on next travel sprung weight information, wherein correcting the estimated degree of unevenness includes reducing the estimated degree of unevenness for heavier vehicles;

causing the processing circuitry to, based on the corrected degree of unevenness of the road surface, determine the control requirement to be imposed on the control target at the location indicated by the location information of the past data during travel of the rough terrain vehicle; and causing the processing circuitry to impose the determined control requirement on the control target.

19. The control requirement determining method according to claim 18, wherein behavior information detected by a behavior sensor mounted on the rough terrain vehicle to detect the behavior of the vehicle body and a geographical location of the vehicle body at which the behavior information was acquired are stored as the past data in which the behavior information and the geographical location are associated with each other.

20. The control requirement determining method according to claim 18, wherein
- the control target includes a torque generator that generates output power for travel of the rough terrain vehicle, and
- in the storing the past data,
  - in case that the rough terrain vehicle is caused to travel in the absence of the past data previously stored in the storage, the torque generator is controlled to cause the rough terrain vehicle to travel at an output power level equal to or lower than a given output power level determined irrespective of the past data, and
  - in case that the rough terrain vehicle is caused to travel in the presence of the past data previously stored in the storage, travel of the rough terrain vehicle at an output power level higher than the given output power level is permitted, and the torque generator is controlled to cause the rough terrain vehicle to travel at an output power level determined based on the previously stored past data.

* * * * *